United States Patent [19]

Heber

[11] Patent Number: 4,811,630

[45] Date of Patent: Mar. 14, 1989

[54] AUTOMATIC SHIFT DEVICE FOR AN EPICYCLIC CHANGE-SPEED GEAR HAVING MEANS FOR BLOCKING THE ENGAGEMENT OF A REVERSE GEAR CLUTCH AND/OR REVERSE GEAR BRAKE

[75] Inventor: Klaus Heber, Remseck, Fed. Rep. of Germany

[73] Assignee: Daimler-Benz Aktiengesellschaft, Stuttgart, Fed. Rep. of Germany

[21] Appl. No.: 162,087

[22] Filed: Feb. 29, 1988

[30] Foreign Application Priority Data

Mar. 27, 1987 [DE] Fed. Rep. of Germany ....... 3710080

[51] Int. Cl.⁴ .............................................. F16H 5/00
[52] U.S. Cl. ............................... 74/752 A; 74/752 C; 74/868
[58] Field of Search ............... 74/752 A, 752 C, 868; 192/4 C

[56] References Cited

U.S. PATENT DOCUMENTS 4,262,554 4/1981 Ahlen et al. ................. 74/868 X
4,488,457 12/1984 Nishimura et al. ................. 74/868

FOREIGN PATENT DOCUMENTS 907695 10/1962 United Kingdom .
1070924 6/1967 United Kingdom .

OTHER PUBLICATIONS

"Automatische MB-Getriebe", Typ W3D080/R und W3A110/R, Daimler-Benz AG, Aug. 1977, pp. 23-25.

Primary Examiner—Rodney H. Bonck
Attorney, Agent, or Firm—Barnes & Thornburg

[57] ABSTRACT

In an automatic shift of an epicyclic change-speed gear, engagement of a reverse gear brake used to shift to reverse gear is blocked until a forward gear clutch used to shift at least one forward gear is disengaged by using the working pressure of the forward gear clutch as a blocking pressure to stress a blocking control element acting upon the valve used for engaging the reverse gear brake.

12 Claims, 1 Drawing Sheet

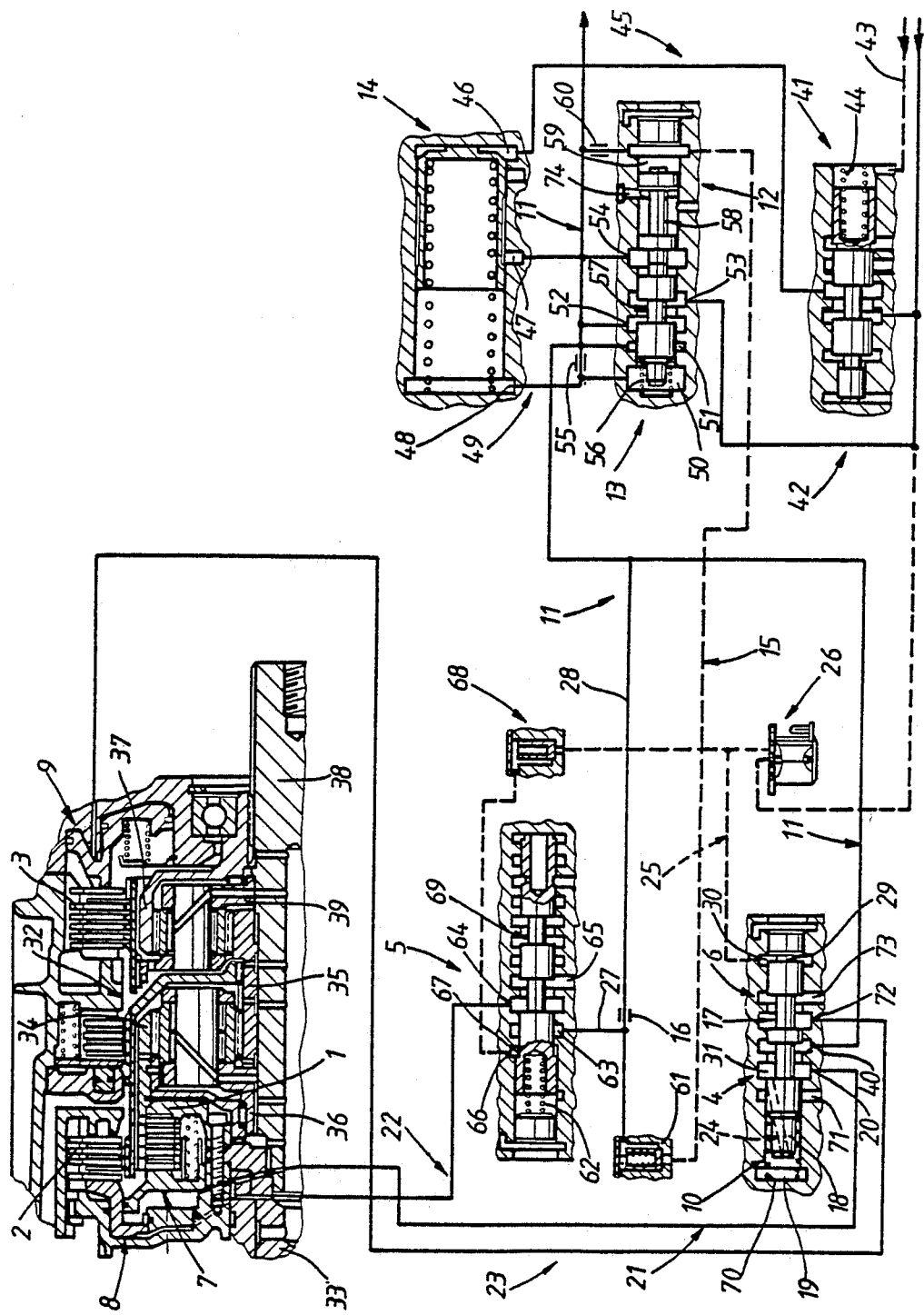

AUTOMATIC SHIFT DEVICE FOR AN EPICYCLIC CHANGE-SPEED GEAR HAVING MEANS FOR BLOCKING THE ENGAGEMENT OF A REVERSE GEAR CLUTCH AND/OR REVERSE GEAR BRAKE

BACKGROUND AND SUMMARY OF THE INVENTION

The invention relates to a shift device of an epicyclic change-speed gear transmission having a forward gear clutch for at least one forward gear to provide a forward drive and a reverse gear clutch and a reverse gear brake to control a reverse gear for a rearward drive, which clutches and brake are engaged by associated shift control means connected respectively to a switch valve means and blocking means to inhibit the engagement of at least one of the reverse gear clutch and reverse gear brake when the forward gear clutch is engaged with a blocking control means responsive to a blocking pressure, whereby the associated shift valve means is lockable in a position disengaging the reverse gear brake.

In a shift device of this type ("Automatische MB-Getriebe Typ W3D 080/R und W3A 110/R" [Automatic MB gears type W3D 080/R and W3A 110/R"] introductory document of Daimler-Benz Aktiengesellschaft KD 20 200 112200-877 4, 2 pages 005/23 to 25), a shift valve of a reverse gear brake is actuable into its position, disconnecting the work pressure by a regulator pressure used as blocking pressure as a function of the travelling speed. This work pressure is used to simultaneously stress the shift control element of the reverse gear clutch, and is also switched off by a manually actuable selector slide valve when the latter is not in its position for a reverse gear drive. The shift valve of the forward gear clutch is likewise supplied with work pressure from a selector slide valve when the latter occupies one of the positions associated with the forward gears. This work pressure maintains the shift valve in its position engaging the forward gear clutch. When the selector slide valve is moved into the position for the reverse gear drive, the pressure line leading to the shift valve of the forward gear clutch is relieved of pressure by the selector slide valve so that the forward gear clutch disengages when the reverse gear brake and reverse gear clutch engage and vice versa.

An underlying aim of the instant invention is to substantially prevent the possibility of the reverse gear being shifted accidentally during the time a shifted forward gear is engaged. These accidental shifts cannot be excluded in the case of shift devices in which, contrary to known shift devices, have neither a manually actuable selector slide valve nor a regulator pressure set as a function of the travel speed, but rather, have shift valves changed over by a control pressure impulse which is determined by solenoid control valves modulated by an electronic control unit. Due to unavoidable leakages in aluminum housings, which accommodates the steel shift slide valves of the shift devices, it is possible for a pressure to build up in the control pressure line leading from the associated solenoid control valve to the shift valves of the reverse gear while the forward gear clutch is engaged, which leads to a shifting engagement of the reverse gear during forward gear engagement.

In order to avoid such dual engagement of forward and reverse gears, there is provided an epicyclic change-speed gear transmission having a forward gear clutch for at least one forward gear to provide a forward drive and a reverse gear clutch and a reverse gear brake to control a reverse gear for a rearward drive, which clutches and brake are engaged by associated shift control means connected respectively to a switch valve means and blocking means to inhibit the engagement of at least one of the reverse gear clutch and reverse gear brake when the forward gear clutch is engaged with a blocking control means responsive to a blocking pressure, whereby the associated shift valve means is lockable in a position disengaging the reverse gear brake.

In the shift device according to the invention, when the forward gear clutch is engaged, its work pressure acts upon the shift valve of the reverse gear brake conjointly with an associated valve spring so that the shift valve is locked in its position maintaining the brake disengaged, so that accidental leakage pressures in the control pressure line, which flows oppositely to the shift valve, cannot lead to accidental changeovers. The unblocking of this shift valve in the course of a normally tripped shifting of the reverse gear may occur, in the case of a structurally separate arrangement of the shift valve of the forward gear clutch from the shift valve of the reverse gear brake, in that the latter is changed over by the control pressure of the solenoid control valve and the blocking pressure at the shift valve of the reverse gear brake is also switched off thereby.

However, if the shift valves of the forward gear clutch and of the reverse gear brake operate with a common shift slide valve wherein a blocking pressure of a blocking control element is connected to pressurize said common slide valve through a valve connection for a work pressure line leading to said shift control means of the forward gear clutch, and wherein said slide valve includes a slide duct leading at one end into said pressure blocking chamber and at another end into a valve housing chamber communicating openly with said valve connection leading to said shift control means of the forward gear clutch, then the unblocking of this common shift valve occurs in the course of a normal shifting of the reverse gear. This is true in that first of all, the shift valve of the reverse gear clutch changes over and connects the relevant shift control element to the system pressure line at a section thereof located between a throttle and shift valve which causes a pressure decrease through the connected control pressure pipe which switches on a receiver which affects the valve control element acting upon the connected regulator valve. By this means, the system pressure in the section of the system pressure line located between throttle and receiver is regulated to a lower pressure value. However, the common shift valve is also connected to this pipe section, so that the work pressure of the forward gear clutch and hence the blocking pressure at this common shift valve are reduced to this low pressure value, whereby the blocking is cancelled and the valve changes over.

This unblocking occurs with greater reliability in the shift device according to the invention if the control pressure controlled by the solenoid control valve means is higher than said regulated reduced pressure of the system pressure line.

It is also advantageous if the shift valve means of the reverse gear brake has a slide valve with one end thereof having a pressure chamber stressable by said control pressure and another end having a pressure chamber of a blocking control element stressable by said forward gear work pressure of the forward gear clutch, by which arrangement and construction of the locking control element, the shift device may be used regardless of whether the shift device operates with two separate or with one common shift valve for forward gear clutch and reverse gear brake.

These and other objects, features and advantages of the present invention will become more apparent from the following description when taken in connection with the accompanying drawing which shows, for the purposes of illustration only, a single embodiment in accordance with the present invention, and wherein:

BRIEF DESCRIPTION OF THE DRAWING

The FIGURE presents a schematic showing of the forward and reverse clutch-brake system of a vehicle epicyclic transmission along with the hydraulic circuit used to prevent engagement of reverse drive prior to disengagement of forward drive.

DETAILED DESCRIPTION OF THE DRAWING

Referring now to the drawing wherein like reference numerals are used to designate like parts and more particularly to the FIGURE which shows at the upper portion thereof, a schematic showing of an epicyclic change-speed gear transmission of a commercial vehicle, particularly a refuse vehicle. The specific details of the transmission are not essential for an understanding of the invention, and thus these details are only broadly identified. This transmission includes as a basic gear, a known "Simpson" gear 32, in which an input shaft 33 drivable by an engine through a hydrodynamic torque converter can be brought into driving connection through a forward gear clutch 1 with a front outer central wheel 34 and through a reverse gear clutch 2 with an intermediate shaft 35 for two inner central wheels. A front planet carrier 36 supports planet wheels meshing with the front outer central wheel 34, with the front inner central wheel, and a rear outer central wheel 37, all of which can be connected integrally in rotation to an output shaft 38, which is used as the transmission output in a known manner. A rear planet carrier 39 supports planet wheels meshing with the rear outer central wheel 37 and with the rear inner central wheel that is connected to a reverse gear brake 3.

The forward gear clutch 1 is normally engaged except in reverse gear driving.

When the reverse gear is shifted for reverse drive, both the reverse gear clutch 2 and the reverse gear brake 3 become engaged.

As stated previously, the particular details of the epicyclic transmission itself are not needed for an understanding of the invention. What is needed is an understanding of the interaction between the hydraulic servo-motors operating the forward gear clutch, the reverse drive clutch and the reverse gear brake.

The forward gear clutch 1 is actuated by an annular axial piston of a shift control element 7, which is connected by a forward gear work pressure pipe 21 to a sliding shift valve 4

The reverse gear clutch 2 is actuated by an annular axial piston of a shift control element 8, which is connected by a reverse gear gear work pressure pipe 22 to a first reverse shift valve 5.

The reverse gear brake 3 is actuated by an annular axial piston of a shift control element 9, which is connected by a reverse brake pressure line 23 to a second reverse shift valve 6.

A first throttle 16 is located in a system pressure line 11 between a line section 27 connected to the first reverse shift valve 5 and a line section 28 leading to a common valve connection 40 of the sliding shift valve 4 and the second reverse shift valve 6, and also to a hydraulic time element mechanism in the form of a receiver 14 connected with regulator valve 13. Regulator valve 13, solenoid control valve 26 and a second regulator valve 41 are each connected to a source of hydraulic pressure through line 42, to which a feed pressure delivered by a pump system through a further regulator valve (both not shown) is maintained.

The second regulator valve 41 is connected to a control line 43 carrying a pressure modulated as a function of vehicle engine load in a known manner. The output of this second regulator valve 41 is termed an accumulator charge pressure, and is a function of a regulator spring 44 and the modulated pressure of engine load, and is delivered to charge-pressure line 45 leading to the receiver 14 of the hydraulic time element mechanism.

The receiver 14 operates as a spring-loaded piston in the manner of a pressure accumulator, and has at its one end of its housing a pressure connection 46, connected to the charge-pressure line 45, for opposing the force of the spring with the pressure in charge-pressure line 45. A pressure connection 47 is located at a central point of the receiver 14 housing and forms a connection to the line section 28 of the system pressure line 11. A pressure connection 48, located at the other housing end of the receiver 14, connects to an expulsion pressure line 49, which leads to a pressure control chamber 50 of the regulator valve 13.

Starting from the control pressure chamber 50 end of the regulator valve 13, there are consecutively located valve connections 51 to 54, of which the valve connections 51, 52 and 54 are connected to the line section 28 of the system pressure line 11, and the valve connection 53 being connected to the source of hydraulic pressure at line 42. The expulsion pressure line 49 is also connected to the valve connection 51 through a second throttle 55 in line section 28 of the system pressure line 11.

The regulator slide valve 57 of the regulator valve 13 is biased in one direction along its sliding axis by a regulator spring 56 arranged in the control pressure chamber 50. The regulator slide valve 57 is maintained in its illustrated switched-off position—in which the valve connection 51 is blocked from direction communication with the pressure chamber 50, and with the valve connections 52 and 53 mutually connected, partially unthrottled.

The system pressure line 11 is connected through its section 28 to the feed pressure line 42 via connections 52, 53. Regulator valve 52 is held in position by a control piston 58 of a valve control element 12 also located in the housing regulator valve 13. Work pressure chamber 59 of control element 12 is connected on the one hand through a third throttle 60 to the line section 28, and on the other hand to a control pressure line 15 which communicates with the section 27 of the system pressure line 11 leading to the first reverse shift valve 5 through a nonreturn valve 61.

The first shift valve 5 is switched into its illustrated position by a valve spring 62. A valve connection 63 connected to the section 27 of the system pressure line 11 is thus blocked by the first shift valve 5. A valve connection 64 connected to the reverse gear work pressure pipe 22 is connected to a substantially pressureless vent connection 65 to drain the actuating pressure for the piston 8 of the reverse gear control element. A second control pressure line 25 is connected between the solenoid control valve 26 and a reversible blocking valve 68 to a valve connection 66 of the first reversing shift valve 5, as well as to chamber 30 of the second reversing shift valve 6. The valve connection 66 connects openly with the control pressure chamber in which a pressure surface 67 of the sliding valve 69 of the first shift valve 5 is located.

By stressing the pressure surface 67 with a high control pressure from control pressure line 25, the slide valve 69 is slideable to the left to allow valve connections 63 and 64 to be connected and the vent connection 65 to be blocked. This allows pressure in line 27 to be fed to the reverse gear actuating piston 8 to engage the reverse clutch 2.

One slide end 18 of the slide valve 17 common to the sliding shift valve 4 and second reverse shift valve 6 is located in the pressure chamber 19 of a blocking control element 10, and is therefore stressed by the pressure in this chamber. A valve spring 70 arranged in the pressure chamber 19 acts upon the slide end 18 of slide valve 17 in the same operative sense. The other side end 29 of the slide valve 17 is located in a control pressure chamber 30, to which the control pressure line 25 is connected.

When the control pressure line 25 is pressureless, the slide valve 17 occupies its illustrated right-hand limit position, in which the pressure chamber 19 of the blocking control element 10 is connected through an inner slide duct 24 of the slide valve 17 to a valve chamber 31 which permanently communicates openly with a valve connection 20 to which the forward gear work pressure line 21 is connected. Moreover, in this illustrated limit position of the slide valve 17, the valve connections 20 and 40 are mutually connected. Also, a valve connection 72 connected to the reverse brake work pressure line 23 is also connected to a substantially pressureless zero vent connection 73 to vent the actuating pressure for the reverse gear brake. Further, a substantially pressureless zero vent connection 71, located in the region between pressure chamber 19 and valve chamber 31 is blocked in the illustrated position of slide valve 17.

The illustrated state of the shift device corresponds to the neutral position, in which: the forward gear clutch 1 is engaged because the sliding shift valve 4 connects the valve connection 20 of the associated forward gear work pressure line 21 to the valve connection 40 of the line section 28 of the system pressure line 11; the reverse gear clutch 2 is disengaged because the first reverse shift valve 5 connects the valve connection 64 of the associated reverse gear work pressure line 22 to the zero vent connection 65; and the reverse gear brake 3 is likewise disengaged, because the second reverse shift valve 6 connects the valve connection 72 of the associated reverse brake pressure line 23 to the zero vent connection 73.

The blocking control element 10 uses the work pressure of the forward gear clutch 1 so that the slide valve 17 is positively locked in its position engaging the forward clutch even if a pressure builds up accidentally in the control pressure line 25 and/or in the control pressure chamber 30 due to leakages.

In the stationary state, pressure equalization is established at the throttles 16, 55 and 60, so that the same high pressure, which is substantially equal to the source of high fluid pressure of the feed pressure line 42, prevails at the pressure connections 46, 47 and 48 of the receiver 14. Consequently, the valve control element 12 occupies its illustrated position against a stop 74 integral with the housing. At this time, the regulator valve 13 and time element receiver 14 are effectively disconnected.

If a normal shifting of the transmission into the reverse gear is wanted, the solenoid control valve 26 is opened by an electronic control unit (not shown) and a connection is thereby established between control pressure line 25 and the supply of hydraulic feed pressure in line 42. At first, there is no change in the position of the slide valve 17, because the same pressure still acts at both its end faces and the valve spring 70 maintains the position assumed.

However, a changeover of the first reverse shift valve 5 occurs under the action of the control pressure at the pressure surface 67, whereby the zero pressure vent connection 65 is blocked and the valve connections 63 and 64 become mutually connected. By this means, the line section 27 located between throttle 16 and the first reverse shift valve 5 becomes connected through the reverse gear work pressure line 22 to the discharged shift control element 8 of the reverse gear clutch 2, so that a significant pressure decrease occurs in the line section 27 due to flow into piston chamber from line 27 and the restriction 16 which limits flow into line 27. Before the changeover, the pressure in line 27 was that of the feed pressure line 42. This pressure decrease in line 27 is propagated through the connected control pressure line 15 because of one way valve 61 to the valve control element 12 of the regulator valve 13, so that the pressure chamber 59 is relieved and the regulator spring 56 moves the regulator slide valve 57 to the right into the regulating position, in which a pressure connection, effectively parallel to the throttle 55, is established between control pressure chamber 50 and valve connection 51. The expulsion pressure line 49 thereby becomes effective to feed fluid into chamber 50, 51 as the receiver 14 becomes connected to the system pressure line 11. By this means, the regulator valve 13 regulates a system pressure line 11 at a reduced pressure value, determinable by the throttle 55 and the regulator spring 56, which is fed back through the valve connection 54 to the regulator slide 57 as a hydraulic feedback in a customary manner.

In the period between the changeover of the first reverse shift valve 5 of the reverse gear clutch 2 and the commencement of the regulating function of the regulator valve 13 in which the piston of the receiver 14 moves leftward and reaches the pressure connection 47, the volume of oil displaced through the expulsion pressure line 49 is displaced substantially unthrottled through the pressure connection parallel to the throttle 55 into the line section 28, in which an intermediate pressure therefore prevails which is still lower than the reduced pressure value afterwards regulated by the regulator valve 13.

This low pressure value is also adjusted in the valve chamber 31 of the sliding shift valve 4 through the line section 28 and the opened connection between the valve connections 20 and 40, so that the blocking effect of the pressure chamber 19 of the blocking control element 10 connected through the slide duct 24 is cancelled, and the sliding valve 17 is moved into its left-hand limit position counter to the effect of the valve spring 70 by the pressure force in the control pressure chamber 30. In this position, the valve chamber 31, connected by valve connection 20 to forward gear work pressure line 21 and shift control element 7, vents to the zero vent connection 71 to disable the forward gear. Similarly, the slide duct 24 connected to pressure chamber 19 of the blocking control element 10 is also connected to vent 71, so the chamber 70 is disconnected from biasing sliding valve 17. Simultaneously, by this changeover of the sliding valve 17, the zero vent connection 73 becomes blocked and the valve connection 72 of the reverse gear brake work pressure line 23 of the shift control element 9 of the reverse gear brake 3 becomes connected to the valve connection 40 and thus to the line section 28 of the system pressure line 11. This pressure connection then causes engagement of the reverse gear brake.

Thus, one can see that the invention precludes pressure leakage in the control line or pressure line from actuating the reverse gear drive until after the forward gear drive is disconnected.

While I have shown and described only one embodiment in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications as are encompassed by the scope of the appended claims.

What is claimed:

1. Automatic shift device of an epicyclic change-speed gear transmission having a forward gear clutch for a least one forward gear to provide a forward drive and a reverse gear clutch and a reverse gear brake to control a reverse gear for a rearward drive, which clutches and brakes are engaged by associated shift control means connected respectively to a switch valve means and blocking means to inhibit the engagement of at least one of the reverse gear clutch and reverse gear brake when the forward gear clutch is engaged with a blocking control means responsive to a blocking pressure, whereby the associated shift control means is lockable in a position disengaging the reverse gear brake, comprising:

a forward gear work pressure mans providing a forward work pressure line to engage the forward gear clutch and used as a blocking pressure;

said shift control means being connected to a system pressure line includes first and second shift valve means for engaging said reverse gear clutch and reverse gear brake respectively, as well as the shift valve means for engaging the forward speed clutch and the disengaging of the respectively associated reverse clutch or brake synchronously by a control pressure determined by a solenoid control valve means;

said shift valve means of the reverse gear clutch being connected through a throttle to said system pressure line, the pressure of which can be regulated to a reduced pressure value through a valve control element means of a hydraulic time element means; said time element means including a receiver connected to a regulator valve;

said valve control element means communicating through a control pressure line with a section of said system pressure line located between said throttle and said shift valve means of the reverse speed clutch; and wherein the shift valve means of the forward gear clutch communicates with another section of the system pressure line between said throttle and said receiver.

2. Shift device according to claim 1, wherein said control pressure determined by the solenoid control valve means is higher than said regulated reduced pressure of the system pressure line.

3. Shift device according to claim 1, wherein said second shift valve means of the reverse gear brake has a slide valve with one end thereof having a pressure chamber stressable by said control pressure and another end having a pressure chamber of a blocking control element stressable by said forward gear work pressure of the forward gear clutch.

4. Shift device according to claim 2, wherein said second shift valve means of the reverse gear brake has a slide valve with one end thereof having a pressure chamber stressable by said control pressure and another end having a pressure chamber of a blocking control element stressable by said forward gear work pressure of the forward gear clutch.

5. Shift device according to claim 1, wherein said shift valve means of the forward gear clutch and said second shift valve means of the reverse gear brake utilize a common slide valve and said blocking pressure of the blocking control element is connected to pressurized said common slide valve through a valve connection for a work pressure line leading to said shift control means of the forward gear clutch.

6. Shift device according to claim 2, wherein said shift valve means of the forward gear clutch and said second shift valve means of the reverse gear brake utilize a common slide valve and said blocking pressure of the blocking control element is connected to pressurized said common slide valve through a valve connection for a work pressure line leading to said shift control means of the forward gear clutch.

7. Shift device according to claim 3, wherein said shift valve means of the forward gear clutch and said second shift valve means of the reverse gear brake utilize a common slide valve and said blocking pressure of the blocking control element is connected to pressurized said common slide valve through a valve connection for a work pressure line leading to said shift control means of the forward gear clutch.

8. Shift device according to claim 4, wherein said shift valve means of the forward gear clutch and said second shift valve means of the reverse gear brake utilize a common slide valve and said blocking pressure of the blocking control element is connected to pressurized said common slide valve through a valve connection for a work pressure line leading to said shift control means of the forward gear clutch.

9. Shift device according to claim 5, wherein said slide valve includes a slide duct leading at one end into said pressure blocking chamber and at another end into a valve housing chamber communicating openly with said valve connection leading to said shift control means of the forward gear clutch.

10. Shift device according to claim 6, wherein said slide valve includes a slide duct leading at one end into said pressure blocking chamber and at another end into a valve housing chamber communicating openly with said valve connection leading to said shift control means of the forward gear clutch.

11. Shift device according to claim 7, wherein said slide valve includes a slide duct leading at one end into said pressure blocking chamber and at another end into a valve housing chamber communicating openly with said valve connection leading to said shift control means of the forward gear clutch.

12. Shift device according to claim 8, wherein said slide valve includes a slide duct leading at one end into said pressure blocking chamber and at another end into a valve housing chamber communicating openly with said valve connection leading to said shift control means of the forward gear clutch.

* * * * *